United States Patent [19]

Horikawa et al.

[11] 4,435,049
[45] Mar. 6, 1984

[54] TELEPHOTO LENS SYSTEM

[75] Inventors: Yoshiaki Horikawa; Toshihiro Imai, both of Hachiouji, Japan

[73] Assignee: Olympus Optical Co., Ltd., Tokyo, Japan

[21] Appl. No.: 328,393

[22] Filed: Dec. 7, 1981

[30] Foreign Application Priority Data

Dec. 8, 1980 [JP] Japan .................................. 55-172099

[51] Int. Cl.$^3$ .......................... G02B 9/62; G02B 13/02
[52] U.S. Cl. ...................................... 350/454; 350/464
[58] Field of Search ................................ 350/454, 464

[56] References Cited

U.S. PATENT DOCUMENTS

3,738,739 6/1973 Glatzel et al. ...................... 350/464
3,948,584 4/1976 Basista et al. ...................... 350/454
3,997,248 12/1976 Fujii .................................... 350/454

Primary Examiner—Bruce Y. Arnold
Assistant Examiner—Rebecca D. Gass
Attorney, Agent, or Firm—Cushman, Darby & Cushman

[57] ABSTRACT

A telephoto lens system is disclosed comprising first, second and third positive meniscus lens components each having the convex surface on the object side, a fourth negative meniscus lens component having the convex surface on the object side, a fifth positive or negative cemented meniscus lens component having the convex surface on the image side and a sixth positive lens component. This telephoto lens system has an f-number of about F/2, a telephoto ratio of about 1.1 and a high performance and is compact.

8 Claims, 6 Drawing Figures

TELEPHOTO LENS SYSTEM

BACKGROUND OF THE INVENTION (a) Field of the Invention

This invention relates to a telephoto lens system having an f-number of about F/2, a telephoto ratio of about 1.1 and a high performance and being compact.

(b) Description of the Prior Art

In a large aperture telephoto lens system of a comparatively small telephoto ratio, making the telephoto ratio small by strengthening the refractive power of positive lens components arranged in the front (on the side near to the object), how respective excess aberrations produced as a result can be well corrected and to what extent the aberrations which can not be corrected can be corrected by lens components in the rear (on the side near to the image) are important factors determining whether an excellent lens system is obtained or not. Particularly it has been very difficult to obtain a picture image favorable even to the margin of the image plane by well correcting the aberrations causing the generation of such flare as a coma flare by a sagital lateral aberration and the reduction of the contrast.

SUMMARY OF THE INVENTION

An object of the present invention is to provide a generally well corrected excellent telephoto lens system wherein the refractive power of respective positive lens components is reduced by using three positive lens components for the front positive lens group and the aberration amount to be corrected in the rear lens group is made small by properly selecting the glass material of the respective lens components.

According to the present invention, particularly a thick positive meniscus lens is used for the third lens component so that the spherical aberration may be well corrected to improve the center performance, the meridional lateral aberration may be made small while making the astigmatic difference small and suppressing the curvature of field to be small, the sagital lateral aberration which has been heretofore hard to simultaneously suppress may be suppressed to be small, a favorable image low in the flare to the margin and high in the contrast may be thereby obtained and a lens system by which an excellent image is obtained from a small stop aperture to a maximum stop aperture may be made. Further, by using an anomalous dispersion glass, the chromatic aberration can be well corrected. Such bad influence on the other aberrations as is caused by using the anomalous dispersion glass (generally of a low refractive index) for a compact lens system of a small telephoto ratio can be kept minimum as much as possible by using this anomalous dispersion glass for the middle lens component (the second lens component) among the positive lens components forming the front positive lens group.

Figure 1:
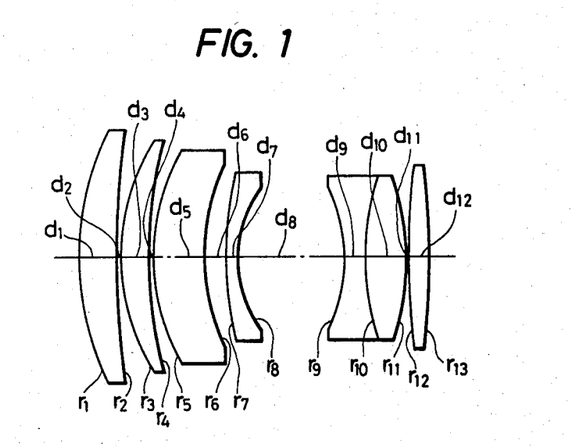
FIG. 1 is a sectional view of the telephoto lens system according to the present invention.
Figure 2:
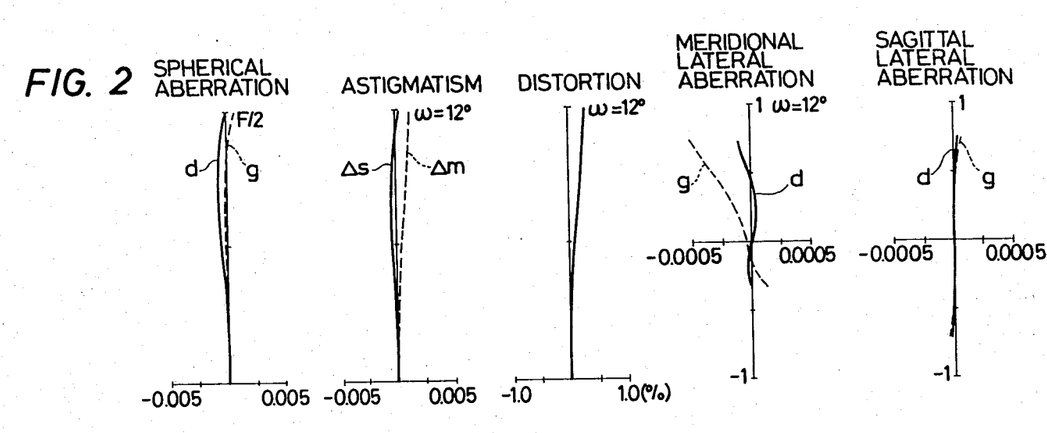
FIGS. 2 through 6 are graphs respectively illustrating aberration curves of the Embodiments 1 through 5 of the present invention.
Figure 3:
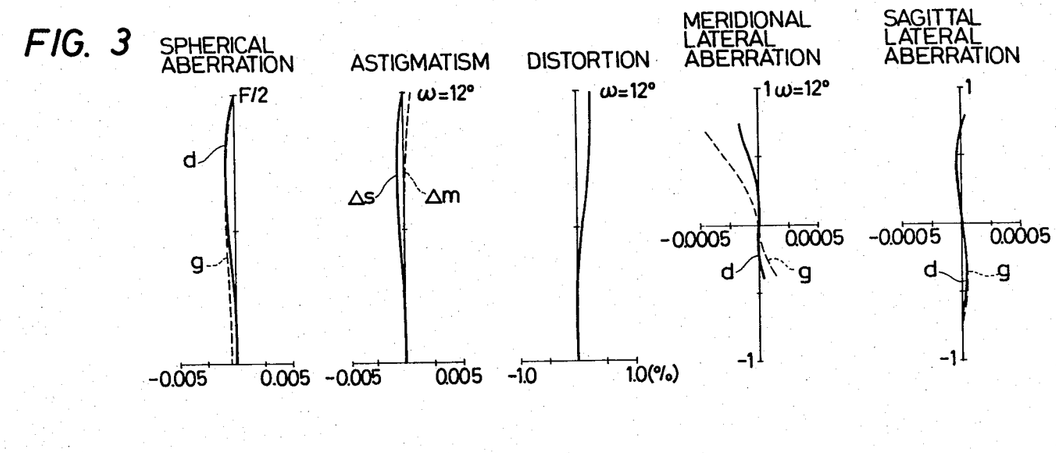
Figure 4:
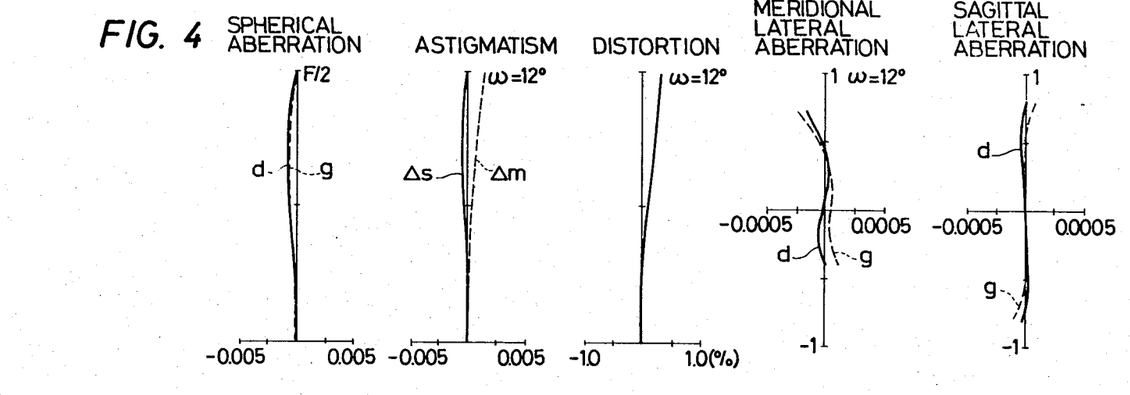
Figure 5:
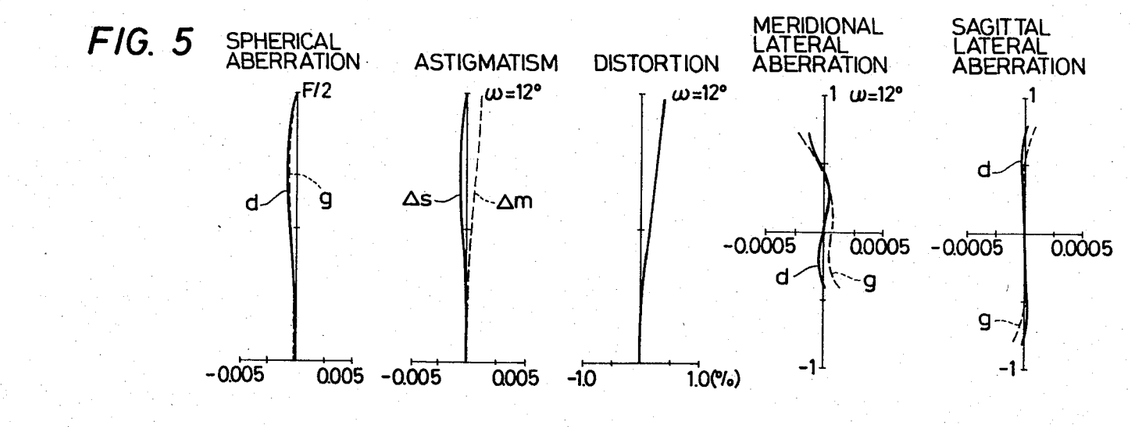
Figure 6:
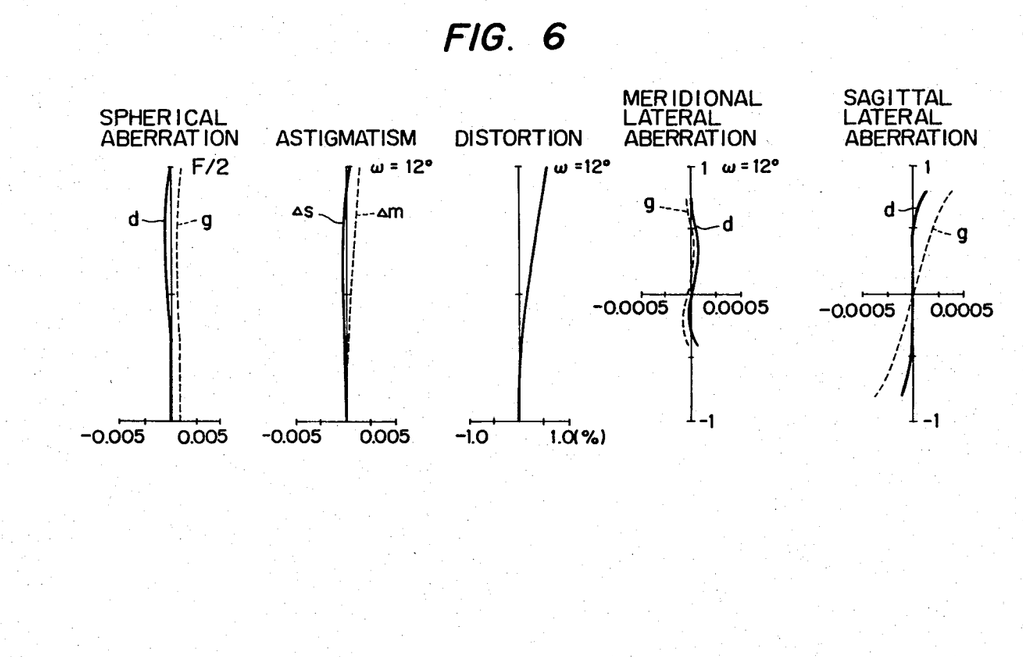

The lens system of the present invention based on the above description is of such formation as is shown in FIG. 1, comprises a first lens component, second lens component and third lens component each of which is a positive meniscus lens with the convex surface on the object side, a fourth lens component which is a negative meniscus lens with the convex surface on the object side, a fifth lens component which is a positive or negative cemented lens with the convex surface on the image side and a sixth lens component which is a positive lens and is characterized by satisfying the following respective conditions:

$1.6 < f_{1234}/f < 2.3$ (1)

$n_1 > 1.6, n_3 > 1.6$ (2)

$\nu_2 > 60$ (3)

$0.6 < f_{B123}/r_6 < 1.0$ (4)

$0.08f < d_5 < 0.12f$ (5)

$0.09f < d_9 + d_{10} < 0.15f$ (6)

wherein the reference symbol f represents a focal length of the entire system, $f_{1234}$ represents a composite focal length from the first lens component to the fourth lens component, $n_1$ and $n_3$ represent respectively refractive indices of the first lens component and third lens component, $\nu_2$ represents an Abbe's number of the second lens component, $d_5$, $d_9$ and $d_{10}$ represent respectively thicknesses of the third lens component and fifth lens component, $r_6$ represents a radius of curvature of the surface on the image side of the third lens component and $f_{B123}$ represents a backfocus from the first lens component to the third lens component.

The above mentioned respective conditions shall be explained in the following.

In order to obtain a lens system of a small telephoto ratio with such large aperture as F/2.0, the front positive lens components must have a strong refractive power, Even if a glass of a high refractive index is used for these positive lens components for this purpose, it will be difficult to well correct the spherical aberration, to make the astigmatism small and also to make the coma small. That is to say, it has been heretofore impossible to well correct the spherical aberration, to make the astigmatic difference small, to suppress the curvature of field, to suppress the meridional lateral abberation to be small and to simultaneously suppress the sagital lateral aberration to be small. Further, the overcorrection of the spherical aberration of the g line and the generation of the chromatic coma have been difficult to solve.

In the present invention, the above described problems are dissolved by using a positive lens of a large thickness for the third lens component. The conditions relating to this third lens component are conditions (4) and (56). In the condition (5), if $d_5$ is smaller than 0.08f, it will be impossible to well correct the spherical aberration, to make the astigmatic difference small, to suppress the curvature of field and to simultaneously suppress the meridional lateral aberration and sagital lateral aberration to be small. Further, the overcorrection of the spherical aberration of the g line and the generation of the chromatic coma will be no longer able to be prevented. If $d_5$ is larger than 0.12f, a compact lens system will be no longer able to be formed. In the condition (4), if $f_{B123}/r_6$ is larger than 1.0, the astigmatic difference will become so large that the coma by the lower ray will be undercorrected. If $f_{B123}/r_6$ is smaller than 0.6, the coma will be occurred.

Now, the condition (1) is to suppress the telephoto ratio to be small and relates to the focal length $f_{1234}$ of the front group. If $f_{1234}/f$ is smaller than 1.6, the occurred aberration will be large. In case $f_{1234}/f$ is larger than 2.3, the telephoto ratio will become so large that the lens system will not be able to be made compact.

In the present invention, in order to obtain a compact bright telephoto lens system, the front group is formed of three positive lens components so as to reduce the refractive power of the respective lens components and the selection of the glass material for them is considered. In order to correct the spherical aberration and coma, it is advantageous to enlarge the radius of curvature by using a glass material high in the refractive index. On the other hand, in respect of the correction of the chromatic aberration, it is advantageous to use an anomalous dispersion glass. However, generally the anomalous dispersion glass is so low in the refractive index that the radius of curvature can not be made large. It is not desirable to the correction of the spherical aberration and coma.

In the present invention, when a high refractive index material is used for the first lens component and third lens component as shown in the condition (2) and a low dispersion anomalous dispersion glass is used as shown in the condition (3) for the second lens component arranged between them so that the chromatic aberration will be well corrected and the influence on such aberrations as the spherical aberration and coma will be minimized. Further, as described above, by enlarging the thickness of the third lens component, these aberrations are corrected to be better balanced. That is to say, it is advantageous to use the anomalous dispersion glass used to correct the chromatic aberration for the first lens component high in the height of the ray of light. However, if the anomalous dispersion glass is used for the first lens component, the radius of curvature of the first lens component will become so small that the spherical aberration and coma will deteriorate and, even if the third lens component is made high in the refractive index and large in the thickness, it will be difficult to correct the aberrations. Further, if the anomalous dispersion glass is used for the third lens component, the ray height will become so low that the effect of the correction of the chromatic aberration will not be well obtained.

Thus, in the lens system of the present invention, the front group is formed of three positive lenses in order not only to prevent the generation of the spherical aberration and the like by merely increasing the two positive lenses to three positive lenses but also to be able to well correct the chromatic aberration while keeping the other aberrations good by using the anomalous dispersion glass for the middle lens among the three positive lenses.

If the above mentioned condition (2) is deviated, the spherical aberration and coma will not be able to be well corrected. Also, if the condition (3) is deviated, the chromatic aberration will be no longer able to be well corrected.

When the front group is formed as explained above, the burden of the aberration correction by the rear group will be reduced. Therefore, the condition (6) is satisfied for the rear group so that the general aberration of the entire lens system may be favorable and a compact lens system excellent in the chromatic aberration correction may be obtained.

The condition (6) defines the thickness of the cemented lens component in the rear group. By enlarging the thickness of this cemented lens component, such aberrations as the spherical aberration and astigmatism can be balanced to make the upper and lower comas symmetrical with each other. That is to say, if $d_9+d_{10}$ is larger than $0.15f$, the curvature of field will be overcorrected and the lens system will not be able to be made compact.

As explained above, the lens system of the present invention is such lens system as is shown in FIG. 1 and satisfies the conditions (1) to (6) to well attain the object of the present invention.

However, the lens system can be made better by satisfying the following conditions (7) to (9):

$$n_4>1.7, \nu_4<30 \quad (7)$$

$$2.3<f_3/f<5 \quad (8)$$

$$|f_{56}/f|>2.5 \quad (9)$$

wherein the reference symbol $n_4$ represents a refractive index of the fourth lens component, $\nu_4$ represents an Abbe's number of the fourth lens component, $f_3$ represents a focal length of the third lens component and $f_{56}$ represents a focal length of the fifth lens component.

The condition (7) is provided so that the respective aberrations such as the negative spherical aberration occurred in the positive lens components in the front group may be corrected with the fourth lens component so as to be able to be corrected in the rear group. If $n_4$ and $\nu_4$ deviate from the condition (7), it will not be easy to correct the above mentioned respective aberrations in the rear group. It is not preferable.

The condition (8) relates to the condition (4) and defines the third lens component. In order to better correct the astigmatic difference, meridional lateral aberration and sagital lateral aberration, it is preferable that the refractive power of the third lens component is weak. That is to say, if $f_3/f<2.3$, the above mentioned respective aberrations will be no longer able to be well corrected. However, if $f_3/f>5$, the total length of the lens system will tend to be so long that the lens system will be no longer able to be compacted.

The condition (9) is a condition relating to the cemented lens. In order to improve the symmetry of the astigmatism and coma, it is preferable to weaken the power of the fifth lens component which is a cemented lens so that the correction by the condition (6) will be more effective. Therefore, if $|f_{56}/f|<2.5$, the above mentioned aberrations will be hard to correct.

DESCRIPTION OF THE PREFERRED EMBODIMENTS

Preferred embodiments of the telephoto lens system according to the present invention are as shown below.

Embodiment 1

$r_1 = 0.5632$
$d_1 = 0.0729$  $n_1 = 1.6779$  $\nu_1 = 55.3$
$r_2 = 3.1969$
$d_2 = 0.0079$
$r_3 = 0.4264$
$d_3 = 0.0533$  $n_2 = 1.4970$  $\nu_2 = 81.6$
$r_4 = 0.8621$
$d_4 = 0.0109$
$r_5 = 0.4393$

-continued

| | | |
|---|---|---|
| $d_5 = 0.0886$ | $n_3 = 1.6516$ | $\nu_3 = 58.7$ |
| $r_6 = 0.4915$ | | |
| $d_6 = 0.0535$ | | |
| $r_7 = 1.3747$ | | |
| $d_7 = 0.0180$ | $n_4 = 1.7552$ | $\nu_4 = 27.5$ |
| $r_8 = 0.2384$ | | |
| $d_8 = 0.2332$ | | |
| $r_9 = -0.3427$ | | |
| $d_9 = 0.0210$ | $n_5 = 1.6398$ | $\nu_5 = 34.5$ |
| $r_{10} = 0.8443$ | | |
| $d_{10} = 0.0820$ | $n_6 = 1.6968$ | $\nu_6 = 55.5$ |
| $r_{11} = -0.4942$ | | |
| $d_{11} = 0.0028$ | | |
| $r_{12} = 1.3271$ | | |
| $d_{12} = 0.0518$ | $n_7 = 1.7174$ | $\nu_7 = 29.5$ |
| $r_{13} = -0.7852$ | | |

$f = 1.0$, F/2.0
$f_{1234}/f = 2.16$, $f_{B1234}/r_6 = 0.73$
$f_3/f = 3.80$, $f_{56}/f = -4.32$

Embodiment 2

| | | |
|---|---|---|
| $r_1 = 0.6226$ | | |
| $d_1 = 0.0523$ | $n_1 = 1.6779$ | $\nu_1 = 55.3$ |
| $r_2 = 2.9719$ | | |
| $d_2 = 0.0046$ | | |
| $r_3 = 0.4152$ | | |
| $d_3 = 0.0537$ | $n_2 = 1.4970$ | $\nu_2 = 81.6$ |
| $r_4 = 0.9496$ | | |
| $d_4 = 0.0072$ | | |
| $r_5 = 0.4073$ | | |
| $d_5 = 0.1095$ | $n_3 = 1.6516$ | $\nu_3 = 58.7$ |
| $r_6 = 0.4288$ | | |
| $d_6 = 0.0440$ | | |
| $r_7 = 0.8565$ | | |
| $d_7 = 0.0180$ | $n_4 = 1.7552$ | $\nu_4 = 27.5$ |
| $r_8 = 0.2277$ | | |
| $d_8 = 0.2225$ | | |
| $r_9 = -0.4070$ | | |
| $d_9 = 0.0282$ | $n_5 = 1.6398$ | $\nu_5 = 34.5$ |
| $r_{10} = 0.6403$ | | |
| $d_{10} = 0.903$ | $n_6 = 1.6968$ | $\nu_8 = 56.5$ |
| $r_{11} = -0.6970$ | | |
| $d_{11} = 0.0060$ | | |
| $r_{12} = 1.2898$ | | |
| $d_{12} = 0.0418$ | $n_7 = 1.7215$ | $\nu_7 = 29.2$ |
| $r_{13} = -0.7944$ | | |

$f = 1.0$, F/2.0
$f_{1234}/f = 1.81$, $f_{B123}/r_6 = 0.83$
$f_3/f = 4.14$, $f_{56}/f = -2.67$

Embodiment 3

| | | |
|---|---|---|
| $r_1 = 0.6477$ | | |
| $d_1 = 0.0780$ | $n_1 = 1.6170$ | $\nu_1 = 62.8$ |
| $r_2 = 3.2938$ | | |
| $d_2 = 0.0040$ | | |
| $r_3 = 0.4539$ | | |
| $d_3 = 0.0562$ | $n_2 = 1.4970$ | $\nu_2 = 81.6$ |
| $r_4 = 0.8860$ | | |
| $d_4 = 0.0064$ | | |
| $r_5 = 0.3857$ | | |
| $d_5 = 0.1116$ | $n_3 = 1.6425$ | $\nu_3 = 58.4$ |
| $r_6 = 0.4485$ | | |
| $d_6 = 0.0432$ | | |
| $r_7 = 0.7022$ | | |
| $d_7 = 0.0197$ | $n_4 = 1.7552$ | $\nu_4 = 27.5$ |
| $r_8 = 0.2314$ | | |
| $d_8 = 0.2243$ | | |
| $r_9 = -0.3745$ | | |
| $d_9 = 0.0495$ | $n_5 = 1.5814$ | $\nu_5 = 40.8$ |
| $r_{10} = 0.6167$ | | |
| $d_{10} = 0.0777$ | $n_6 = 1.7440$ | $\nu_6 = 44.7$ |
| $r_{11} = -0.5743$ | | |
| $d_{11} = 0.0062$ | | |
| $r_{12} = 1.8142$ | | |
| $d_{12} = 0.0417$ | $n_7 = 1.6970$ | $\nu_7 = 48.5$ |
| $r_{13} = -1.1928$ | | |

$f = 1.0$, F/2.0
$f_{1234}/f = 1.81$, $f_{B123}/r_6 = 0.85$
$f_3/f = 2.53$, $f_{56}/f = 6.42$

Embodiment 4

| | | |
|---|---|---|
| $r_1 = 0.6432$ | | |
| $d_1 = 0.0777$ | $n_1 = 1.6170$ | $\nu_1 = 62.8$ |
| $r_2 = 3.2824$ | | |
| $d_2 = 0.0040$ | | |
| $r_3 = 0.4558$ | | |
| $d_3 = 0.0562$ | $n_2 = 1.4970$ | $\nu_2 = 81.6$ |
| $r_4 = 0.8887$ | | |
| $d_4 = 0.0064$ | | |
| $r_5 = 0.3815$ | | |
| $d_5 = 0.1126$ | $n_3 = 1.6170$ | $\nu_3 = 62.8$ |
| $r_6 = 0.4560$ | | |
| $d_6 = 0.0433$ | | |
| $r_7 = 0.6894$ | | |
| $d_7 = 0.0198$ | $n_4 = 1.7552$ | $\nu_4 = 27.5$ |
| $r_8 = 0.2287$ | | |
| $d_8 = 0.2242$ | | |
| $r_9 = -0.3764$ | | |
| $d_9 = 0.0541$ | $n_5 = 1.5814$ | $\nu_5 = 40.8$ |
| $r_{10} = 0.6081$ | | |
| $d_{10} = 0.0811$ | $n_6 = 1.7440$ | $\nu_6 = 44.7$ |
| $r_{11} = -0.5896$ | | |
| $d_{11} = 0.0063$ | | |
| $r_{12} = 1.9728$ | | |
| $d_{12} = 0.0417$ | $n_7 = 1.7440$ | $\nu_7 = 44.7$ |
| $r_{13} = -1.2335$ | | |

$f = 1.0$, F/2.0
$f_{1234}/f = 1.76$, $f_{B123}/r_6 = 0.83$
$f_3/f = 2.40$, $f_{56}/f = 7.18$

Embodiment 5

| | | |
|---|---|---|
| $r_1 = 0.6436$ | | |
| $d_1 = 0.0744$ | $n_1 = 1.6170$ | $\nu_1 = 62.8$ |
| $r_2 = 3.4873$ | | |
| $d_2 = 0.0011$ | | |
| $r_3 = 0.4708$ | | |
| $d_3 = 0.0601$ | $n_2 = 1.4970$ | $\nu_2 = 81.6$ |
| $r_4 = 0.9042$ | | |
| $d_4 = 0.0041$ | | |
| $r_5 = 0.3847$ | | |
| $d_5 = 0.1171$ | $n_3 = 1.6425$ | $\nu_3 = 58.4$ |
| $r_6 = 0.4385$ | | |
| $d_6 = 0.0393$ | | |
| $r_7 = 0.7168$ | | |
| $d_7 = 0.0231$ | $n_4 = 1.7618$ | $\nu_4 = 26.5$ |
| $r_8 = 0.2326$ | | |
| $d_8 = 0.2070$ | | |
| $r_9 = -0.3592$ | | |
| $d_9 = 0.0455$ | $n_5 = 1.5814$ | $\nu_5 = 40.8$ |
| $r_{10} = 0.5959$ | | |
| $d_{10} = 0.0750$ | $n_6 = 1.7200$ | $\nu_6 = 42.0$ |
| $r_{11} = -0.5380$ | | |
| $d_{11} = 0.0060$ | | |
| $r_{12} = 1.8088$ | | |
| $d_{12} = 0.0582$ | $n_7 = 1.6968$ | $\nu_7 = 55.5$ |
| $r_{13} = -1.0970$ | | |

$f = 1.0$, F/2.0
$f_{1234}/f = 1.86$, $f_{B123}/r_6 = 0.87$
$f_3/f = 2.64$, $f_{56}/f = 9.46$ wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, and the reference symbols $\nu_1$ through $\nu_7$ respectively represent Abbe's numbers of respective lens components.

We claim:

1. A telephoto lens system comprising: first, second and third positive meniscus lens components, each having the convex surface on the object side; a fourth negative meniscus lens component having the convex surface on the object side; a fifth positive cemented meniscus lens component having the convex surface on the image side; and, a sixth positive lens component; said lens system satisfying the following conditions $$1.6 < f_{1234}/f < 2.3 \tag{1}$$

$$n_1 > 1.6, n_3 > 1.6 \quad (2)$$

$$\nu_2 < 60 \quad (3)$$

$$0.6 < f_{B123}/r_6 < 1.0 \quad (4)$$

$$0.08f < d_5 < 0.12f \quad (5)$$

$$0.09f < d_9 + d_{10} < 0.15f \quad (6)$$

wherein the reference symbol f represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $n_1$ and $n_3$ respectively represent refractive indices of the first lens component and the third lens component, the reference symbol $\nu_2$ represents the Abbe's number of the second lens component, the reference symbol $r_6$ represents the radius of curvature of the third lens component, and the reference symbols $d_5$, $d_9$ and $d_{10}$ respectively represent thicknesses of respective lenses forming the third lens component and the fifth lens component.

2. A telephoto lens system comprising: first, second and third positive meniscus lens components, each having the convex surface on the object side; a fourth negative meniscus lens component having the convex surface on the object side; a fifth negative cemented meniscus lens component having the convex surface on the image side; and, a sixth positive lens component, said lens system satisfying the following conditions $$1.6 < f_{1234}/f < 2.3 \quad (1)$$

$$n_1 > 1.6, n_3 > 1.6 \quad (2)$$

$$\nu_2 > 60 \quad (3)$$

$$0.6 < f_{B123}/r_6 < 1.0 \quad (4)$$

$$0.08f < d_5 < 0.12f \quad (5)$$

$$0.09f < d_9 + d_{10} < 0.15f \quad (6)$$

wherein the reference symbol f represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $n_1$ and $n_3$ respectively represent refractive indices of the first lens component and the third lens component, the reference symbol $\nu_2$ represents the Abbe's number of the second lens component, the reference symbol $r_6$ represents the radius of curvature of the third lens component, and the reference symbols $d_5$, $d_9$ and $d_{10}$ respectively represent thicknesses of respective lenses forming the third lens component and the fifth lens component.

3. A telephoto lens system according to claim 1 or 2 further satisfying the following conditions:

$$n_4 > 1.7, \nu_4 < 30 \quad (4)$$

$$2.3 < f_3/f < 5 \quad (8)$$

$$|f_{56}/f| > 2.5 \quad (9)$$

wherein the reference symbol $n_4$ represents the refractive index of the fourth lens component, the reference symbol $\nu_4$ represents the Abbe's number of the fourth lens component, the reference symbols $f_3$ and $f_{56}$ respectively represent the respective focal lengths of the third lens component and the fifth lens component.

4. A telephoto lens system according to claim 2 having the following numerical data:

| | | |
|---|---|---|
| $r_1 = 0.5632$ | | |
| $d_1 = 0.0729$ | $n_1 = 1.6779$ | $\nu_1 = 55.3$ |
| $r_2 = 3.1969$ | | |
| $d_2 = 0.0079$ | | |
| $r_3 = 0.4264$ | | |
| $d_3 = 0.0533$ | $n_2 = 1.4970$ | $\nu_2 = 81.6$ |
| $r_4 = 0.8621$ | | |
| $d_4 = 0.0109$ | | |
| $r_5 = 0.4393$ | | |
| $d_5 = 0.0886$ | $n_3 = 1.6516$ | $\nu_3 = 58.7$ |
| $r_6 = 0.4915$ | | |
| $d_6 = 0.0535$ | | |
| $r_7 = 1.3747$ | | |
| $d_7 = 0.0180$ | $n_4 = 1.7552$ | $\nu_4 = 27.5$ |
| $r_8 = 0.2384$ | | |
| $d_8 = 0.2332$ | | |
| $r_9 = -0.3427$ | | |
| $d_9 = 0.0210$ | $n_5 = 1.6398$ | $\nu_5 = 34.5$ |
| $r_{10} = 0.8443$ | | |
| $d_{10} = 0.0820$ | $n_6 = 1.6968$ | $\nu_6 = 55.5$ |
| $r_{11} = -0.4942$ | | |
| $d_{11} = 0.0028$ | | |
| $r_{12} = 1.3271$ | | |
| $d_{12} = 0.0518$ | $n_7 = 1.7174$ | $\nu_7 = 29.5$ |
| $r_{13} = -0.7852$ | | |
| $f = 1.0$, | F/2.0 | |
| $f_{1234}/f = 2.16$, | $f_{B123}/r_6 = 0.73$ | |
| $f_3/f = 3.80$, | $f_{56}/f = -4.32$ | | wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, the reference symbols $\nu_1$ through $\nu_7$ respectively represent Abbe's numbers of respective lens components, the reference symbol f represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $f_3$ and $f_{56}$ respectively represent the respective focal lengths of the third lens component and the fifth lens component, and the reference symbol F represents the f-number of the lens system.

5. A telephoto lens system according to claim 2 having the following numerical data:

| | | |
|---|---|---|
| $r_1 = 0.6226$ | | |
| $d_1 = 0.0523$ | $n_1 = 1.6779$ | $\nu_1 = 55.3$ |
| $r_2 = 2.9719$ | | |
| $d_2 = 0.0046$ | | |
| $r_3 = 0.4152$ | | |
| $d_3 = 0.0537$ | $n_2 = 1.4970$ | $\nu_2 = 81.6$ |
| $r_4 = 0.9496$ | | |
| $d_4 = 0.0072$ | | |
| $r_5 = 0.4073$ | | |
| $d_5 = 0.1095$ | $n_3 = 1.6516$ | $\nu_3 = 58.7$ |
| $r_6 = 0.4288$ | | |
| $d_6 = 0.0440$ | | |
| $r_7 = 0.8565$ | | |
| $d_7 = 0.0180$ | $n_4 = 1.7552$ | $\nu_4 = 27.5$ |
| $r_8 = 0.2277$ | | |
| $d_8 = 0.2225$ | | |
| $r_9 = -0.4070$ | | |
| $d_9 = 0.0282$ | $n_5 = 1.6398$ | $\nu_5 = 34.5$ |

-continued

| | | |
|---|---|---|
| $r_{10} = 0.6403$ | | |
| $d_{10} = 0.0903$ | $n_6 = 1.6968$ | $\nu_6 = 56.5$ |
| $r_{11} = -0.6970$ | | |
| $d_{11} = 0.0060$ | | |
| $r_{12} = 1.2898$ | | |
| $d_{12} = 0.0418$ | $n_7 = 1.7215$ | $\nu_7 = 29.2$ |
| $r_{13} = -0.7944$ | | |
| $f = 1.0,$ | F/2.0 | |
| $f_{1234}/f = 1.81,$ | $f_{B123}/r_6 = 0.83$ | |
| $f_3/f = 4.14,$ | $f_{56}/f = -2.67$ | | wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, the reference symbols $\nu_1$ through $\nu_7$ respecively represent Abbe's numbers of respective lens components, the reference symbol $f$ represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $f_3$ and $f_{56}$ respectively represent the respective focal lengths of the third lens component and the fifth lens component, and the reference symbol F represents the f-number of the lens system.

6. A telephoto lens system according to claim 1 having the following numerical data:

| | | |
|---|---|---|
| $r_1 = 0.6477$ | | |
| $d_1 = 0.0780$ | $n_1 = 1.6170$ | $\nu_1 = 62.8$ |
| $r_2 = 3.2938$ | | |
| $d_2 = 0.0040$ | | |
| $r_3 = 0.4539$ | | |
| $d_3 = 0.0562$ | $n_2 = 1.4970$ | $\nu_2 = 81.6$ |
| $r_4 = 0.8860$ | | |
| $d_4 = 0.0064$ | | |
| $r_5 = 0.3857$ | | |
| $d_5 = 0.1116$ | $n_3 = 1.6425$ | $\nu_3 = 58.4$ |
| $r_6 = 0.4485$ | | |
| $d_6 = 0.0432$ | | |
| $r_7 = 0.7022$ | | |
| $d_7 = 0.0197$ | $n_4 = 1.7552$ | $\nu_4 = 27.5$ |
| $r_8 = 0.2314$ | | |
| $d_8 = 0.2243$ | | |
| $r_9 = -0.3745$ | | |
| $d_9 = 0.0495$ | $n_5 = 1.5814$ | $\nu_5 = 40.8$ |
| $r_{10} = 0.6167$ | | |
| $d_{10} = 0.0777$ | $n_6 = 1.7440$ | $\nu_6 = 44.7$ |
| $r_{11} = -0.5743$ | | |
| $d_{11} = 0.0062$ | | |
| $r_{12} = 1.8142$ | | |
| $d_{12} = 0.0417$ | $n_7 = 1.6970$ | $\nu_7 = 48.5$ |
| $r_{13} = -1.1928$ | | |
| $f = 1.0,$ | F/2.0 | |
| $f_{1234}/f = 1.81,$ | $f_{B123}/r_6 = 0.85$ | |
| $f_3/f = 2.53,$ | $f_{56}/f = 6.42$ | | wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, the reference symbols $\nu_1$ through $\nu_7$ respectively represent Abbe's numbers of respective lens components, the reference symbol $f$ represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $f_3$ and $f_{56}$ respectively represent the respective focal lengths of the third lens component and the fifth lens component, and the reference symbol F represents the f-number of the lens system.

7. A telephoto lens system according to claim 1 having the following numerical data:

| | | |
|---|---|---|
| $r_1 = 0.6432$ | | |
| $d_1 = 0.0777$ | $n_1 = 1.6170$ | $\nu_1 = 62.8$ |
| $r_2 = 3.2824$ | | |
| $d_2 = 0.0040$ | | |
| $r_3 = 0.4558$ | | |
| $d_3 = 0.0562$ | $n_2 = 1.4970$ | $\nu_2 = 81.6$ |
| $r_4 = 0.8887$ | | |
| $d_4 = 0.0064$ | | |
| $r_5 = 0.3815$ | | |
| $d_5 = 0.1126$ | $n_3 = 1.6170$ | $\nu_3 = 62.8$ |
| $r_6 = 0.4560$ | | |
| $d_6 = 0.0433$ | | |
| $r_7 = 0.6894$ | | |
| $d_7 = 0.0198$ | $n_4 = 1.7552$ | $\nu_4 = 27.5$ |
| $r_8 = 0.2287$ | | |
| $d_8 = 0.2242$ | | |
| $r_9 = -0.3764$ | | |
| $d_9 = 0.0541$ | $n_5 = 1.5814$ | $\nu_5 = 40.8$ |
| $r_{10} = 0.6081$ | | |
| $d_{10} = 0.0811$ | $n_6 = 1.7440$ | $\nu_6 = 44.7$ |
| $r_{11} = -0.5896$ | | |
| $d_{11} = 0.0063$ | | |
| $r_{12} = 1.9728$ | | |
| $d_{12} = 0.0417$ | $n_7 = 1.7440$ | $\nu_7 = 44.7$ |
| $r_{13} = -1.2335$ | | |
| $f = 1.0,$ | F/2.0 | |
| $f_{1234}/f = 1.76,$ | $f_{B123}/r_6 = 0.83$ | |
| $f_3/f = 2.40,$ | $f_{56}/f = 7.18$ | | wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, the reference symbols $\nu_1$ through $\nu_7$ respectively represent Abbe's numbers of respective lens components, the reference symbol $f$ represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $f_3$ and $f_{56}$ respectively represent the respective focal lengths of the third lens component and the fifth lens component, and the reference symbol F represents the f-number of the lens system.

8. A telephoto lens system according to claim 1 having the following numerical data:

| | | |
|---|---|---|
| $r_1 = 0.6436$ | | |
| $d_1 = 0.0744$ | $n_1 = 1.6170$ | $\nu_1 = 62.8$ |
| $r_2 = 3.4873$ | | |
| $d_2 = 0.0011$ | | |
| $r_3 = 0.4708$ | | |
| $d_3 = 0.0601$ | $n_2 = 1.4970$ | $\nu_2 = 81.6$ |
| $r_4 = 0.9042$ | | |

-continued

| | | |
|---|---|---|
| $d_4 = 0.0041$ | | |
| $r_5 = 0.3847$ | | |
| $d_5 = 0.1171$ | $n_3 = 1.6425$ | $\nu_3 = 58.4$ |
| $r_6 = 0.4385$ | | |
| $d_6 = 0.0393$ | | |
| $r_7 = 0.7168$ | | |
| $d_7 = 0.0231$ | $n_4 = 1.7618$ | $\nu_4 = 26.5$ |
| $r_8 = 0.2326$ | | |
| $d_8 = 0.2070$ | | |
| $r_9 = -0.3592$ | | |
| $d_9 = 0.0455$ | $n_5 = 1.5814$ | $\nu_5 = 40.8$ |
| $r_{10} = 0.5959$ | | |
| $d_{10} = 0.0750$ | $n_6 = 1.7200$ | $\nu_6 = 42.0$ |
| $r_{11} = -0.5380$ | | |
| $d_{11} = 0.0060$ | | |
| $r_{12} = 1.8088$ | | |
| $d_{12} = 0.0582$ | $n_7 = 1.6968$ | $\nu_7 = 55.5$ |
| $r_{13} = -1.0970$ | | |
| $f = 1.0,$ | F/2.0 | |
| $f_{1234}/f = 1.86,$ | $f_{B123}/r_6 = 0.87$ | |
| $f_3/f = 2.64,$ | $f_{56}/f = 9.46$ | | wherein the reference symbols $r_1$ through $r_{13}$ respectively represent radii of curvature of respective surfaces of respective lens components, the reference symbols $d_1$ through $d_{12}$ respectively represent thicknesses of respective lens components and airspaces between respective lens components, the reference symbols $n_1$ through $n_7$ respectively represent refractive indices of respective lens components, the reference symbols $\nu_1$ through $\nu_7$ respectively represent Abbe's numbers of respective lens components, the reference symbol f represents the focal length of the entire lens system, the reference symbol $f_{1234}$ represents the composite focal length of the first lens component to the fourth lens component, the reference symbol $f_{B123}$ represents the back focus of the first lens component to the third lens component, the reference symbols $f_3$ and $f_{56}$ respectively represent the respective focal lengths of the third lens component and the fifth lens component, and the reference symbol F represents the f-number of the lens system.

* * * * *